March 19, 1957 G. S. WING 2,785,593
CHAMFERING TOOL
Filed March 22, 1954

INVENTOR.
GEORGE S. WING.
BY
D. Gordon Angus
ATTORNEY.

United States Patent Office 2,785,593
Patented Mar. 19, 1957

2,785,593

CHAMFERING TOOL

George S. Wing, Palos Verdes Estates, Calif., assignor, by mesne assignments, to Hi-Shear Rivet Tool Company, Torrance, Calif., a corporation of California Application March 22, 1954, Serial No. 417,891

5 Claims. (Cl. 77—73.5)

This invention relates to countersinking and spot facing tools, and in particular to a tool for chamfering or spot facing the rear, or blind, end of a hole, an operation commonly known as back-countersinking or back spot facing.

An object of the invention is to provide a convenient tool for back countersinking, back spot facing and deburring which is convenient and rapid in use, and which can be used to countersink or spot face holes in various thicknesses of material, and to various depths therein.

According to this invention, a body is provided which has an internal bore in which a depth control member is engaged to the body so as to be axially movable therein. The depth control member has a shank which protrudes from the body in at least some positions of the depth control member. A stem is rotatably and slidably disposed in a stem passageway through the depth control member, the stem having a laterally projecting cutting tooth with an edge facing the body.

A feature of this invention resides in a shoulder on the stem and an abutment surface on the depth control member which bear against each other in one relative position of the stem and the depth control member so as to limit the depth of cut by the cutting tooth.

A preferred but optional feature of this invention resides in a threaded engagement between the body and the depth control member whereby turning the depth control member adjusts the position of the abutment surface relative to the body.

The above and other features will be fully understood from the following detailed description and the accompanying drawings, of which:

Figure 1:
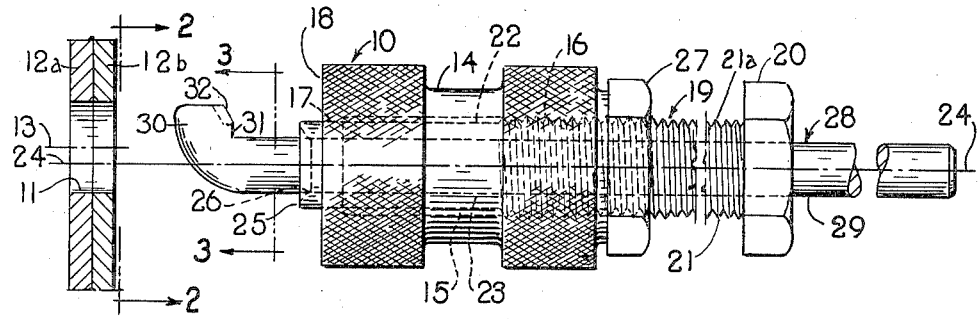
Fig. 1 is an elevation, partly in cross-section, of a back-countersink tool according to the invention along with an object to be back-countersunk.
Figure 2:
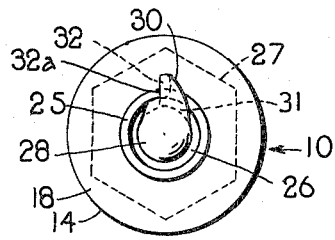
Fig. 2 is an end view, taken at line 2—2 of Fig. 1.
Figure 3:
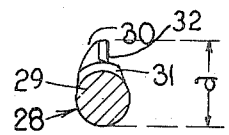
Fig. 3 is a cross-section, taken at line 3—3 of Fig. 1.

Fig. 1 shows a back countersink tool 10 about to be applied to a hole 11 through plates 12a, 12b in order to countersink the back, or left side of plate 12a. The hole has a central axis 13. The tool is provided with a body 14 which has a cylindrical bore 15 therethrough. This bore has internal threads 16 at one end, and a smaller bore 17 at the other. The outer face of the body at the end having the smaller bore is a flat annulus 18. For convenience in handling, the outside of the body may be made cylindrical, and given a knurled surface.

A depth control member 19 is conveniently provided with a hexagonally shaped head 20 at one end. A threaded portion 21 extends away from the head and has external threads 21a which engage with the threads 16 in the body. At the end away from the head, the outside of the member reduces to a shank portion 22, which has an outer wall that is preferably cylindrical, and which has a diameter slightly smaller than the hole 11. This shank portion is long enough to project from the body in at least some positions of the depth control member. A stem passageway 23 pierces the depth control member, and the central axis 24 of the stem passageway 23 and the depth control member 19 coincide. At the end of the shank portion, facing away from the body, there is a continuous abutment surface 25, which may be a surface of revolution, if desired. A chamfer 26 at the inner edge of the abutment surface permits a stem to turn freely therein. By "continuous" is meant a surface which extends around the stem that has a surface which makes contact with the shoulder 31 on the stem in any rotational position of the stem when the shoulder is pulled against the surface. Thus, when the shoulder does bear against the abutment surface, the stem is restrained axially, but can still be rotated. A lock nut 27 is threaded onto the depth control member between the head and the body so that it may be tightened against the body to hold the depth control member in an adjusted position.

A chamfering bit 28 comprises a stem 29 which fits slidably and rotatably in the stem passageway 23. The bit has a cutting tooth 30 with a shoulder 31 ground perpendicular to the central axis of the stem so as to provide a smooth area between the stem and a cutting edge 32. The shoulder may be provided adjacent the cutting edge as part of the cutting tooth, as shown, if desired. The cutting edge 32 extends away from the outer edge of the shoulder, and makes an angle with the central axis of the stem equal to the desired angle of countersink. The cutting edge faces the stem; that is, it is on the end of the tooth nearest the stem proper. The face 32a of the cutting tooth is ground down to form the cutting edge. It preferably makes an angle of about 10° with the central axis of the stem, and is planar for easy tool dressing. The dimension "d," which is the largest diametrical distance across the stem and tooth, will be slightly smaller than the hole 11.

The stem will be held in some appropriate chuck (not shown), and rotated by any desired means, such as a drill motor. Means should be provided in the chuck whereby the chuck will not slip off the stem when the stem is rotated and pulled so that the cutting edge bites into the metal.

Figure 5:
Fig. 5 is an elevation of another bit which may be used in the tool of Fig. 1.

Fig. 5 shows a spot facing bit 33 which may be used instead of the chamfering bit 28 in the tool of Fig. 1. The spot facing bit has a stem 34 with a central axis 35. The stem will fit slidably and rotatably in the stem passageway 23. A cutting tooth 36 has a shoulder 37 ground perpendicular to the central axis of the stem so as to provide a smooth area between the stem and a cutting edge 38. This cutting edge is perpendicular to the central axis 35 of the stem, and faces the stem. The dimension "d," which is the largest diametrical distance across the stem and tooth, will be slightly smaller than the hole 11.

The operation of the device will now be described. The lock nut is first released from contact with the body, and the depth control member is adjusted by turning it in the threaded body until its abutment surface 25 projects the desired distance from the body. This distance is equal to the difference between the combined thickness of the plates and the desired depth of the countersink. The lock nut is tightened, and the depth control member and the body are thereby firmly held in the adjusted position. It will be appreciated that the body and the depth control member need not be provided as separate members, but that, if desired, the projecting sleeve could be made integral with the body. In this case, a different body with an appropriate length of projecting sleeve would have to be used for each different combination of material thickness and depth of countersink.

The stem is next pushed so that the tooth moves away from the body to leave a length of stem between the base of the tooth and the end of the sleeve which is greater than the combined thickness of the plates 12a and 12b. Then the tooth is pushed through the hole. Since the dimension "d" of the tooth is less than the diameter of the hole, it passes through easily to the opposite side of the plates from the body. While the tooth is being pushed through the hole, the central axis of the stem is offset from the axis of the hole (see Fig. 1).

After the tooth reaches the back side of the plates, the body is pressed against the front of the plate 12b, thus moving the projecting end of the shank portion into the hole. The outer wall of the protruding part of the shank portion has a plurality of points thereon which are the farthest points on said outer wall radially outward from the central axis. These points are equidistant from the central axis 24. In the illustrated embodiment, the outer wall of the shank portion 22 is cylindrical. Therefore all points on said outer wall meet this definition, inasmuch as they are all points which are the farthest removed radially from the central axis, and they are all equidistant therefrom. When the shank portion enters the hole, it centers the tool, and the central axis of the hole and the stem coincide. The cutting edge is thereby moved sidewise relative to the axis of the hole. The depth to which the shank portion penetrates is limited by the abument of annulus 18 against the plate 12b.

Figure 4:
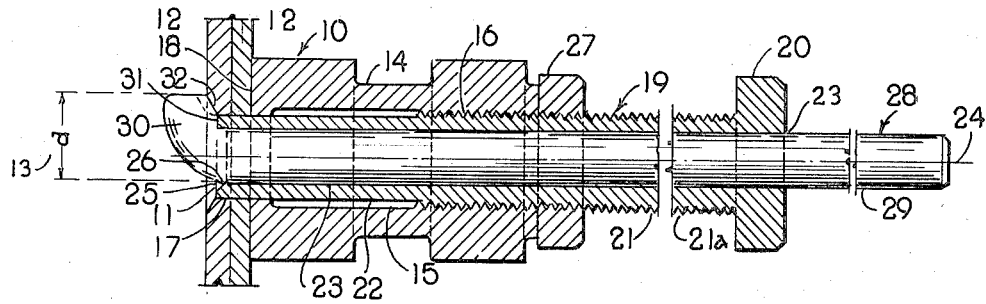
Fig. 4 is an elevation, partly in cross-section, of the tool of Fig. 1 in another position.

The body is then held against the plate, and the stem is rotated by the driving means, thereby turning the cutting edge around the central axis of the stem. The body is held against rotation at this time. At the same time, the stem is pulled so that the cutting edge is drawn against the back side of plate 12a (see Fig. 4). The cutting edge 32 proceeds to cut a countersink 33 until the shoulder 31 bears against the abutment surface 25. Since the smooth shoulder cannot cut into the smooth abutment surface, the stem will not be drawn any further into the hole, and the depth of the countersink is thereby limited while the body is pressed against the plates. The chamfer 26 permits the stem to rotate with less chance of binding between the junction of the shoulder and stem, and the depth control member.

When the desired countersink is formed, the rotation of the stem will be stopped and the tooth withdrawn from the hole. This withdrawal is accomplished by first pulling the body and shank portion away from the plates, and then moving them to one side of the central axis of the hole. The cutting tooth can then be withdrawn through the hole.

The spot facing bit of Fig. 5 is used in the same manner, being inserted in bore 23 in place of the chamfering bit 28. It is inserted in the hole, and then drawn toward the tool while being rotated in the same manner as described for the chamfering bit above. This spot facing tool acts to cut a smooth annular surface around the hole which is perpendicular to the axis of the hole. This is advantageous in operations where the axis of the hole is not perpendicular to the metal plate, or where the surface to be spot faced is irregular. Such a spot faced region provides a smooth bearing surface for fasteners and the like.

It will be appreciated that the parts of this tool are completely interchangeable. Should a different angle of countersink be desired, it is only necessary to substitute a stem having a cutting edge which makes a different angle with the axis of the stem. The angle between the cutting edge and the stem can have any desired value. It may be an acute angle to form a conical seat, an obtuse angle to form a countersink, or a right angle to form a spotface. Therefore a cut of any desired contour may be made by selecting the appropriate angle. In fact, it is not necessary that the cutting edge be straight. It might also be curved or notched, or given any other shape to generate the desired surface of revolution. It will also be appreciated that stems having various dimensions "d" may be used in order to pass through holes of various diameters.

There is thus provided a tool for countersinking or spot facing the back or blind end of a hole which is completely controlled from the front, or tool side. The depth of the cut is completely adjustable by means of the threaded attachment of the depth control member and the body. The combined thickness of the plates in which the back countersink or spot face is to be cut may vary within wide limits, since the stem may be made long enough to be slid through the body so that the cutting tooth stands at any desired distance from the end of the body, and can therefore reach to the back of the plates.

This tool is especially useful in mass production applications, since it can be set in one condition, and will thereafter act to reproduce back countersinks or spotfaces with the same dimensions any desired number of times, and without further adjustments. A positive check exists, since the movement of the stem can be measured if desired, and in any event, the mechanic can "feel" the difference when the cutting edge ceases to cut. The tool is therefore substantially foolproof. When tool use wears down the abutment surface at the shank end, it is only necessary to insert the depth control member farther into the body to make up the difference.

This tool can also be set for a very light cut, and will then act as a convenient deburring tool.

If the depth control member and the body are made integral so that the sleeve projects a fixed distance from the body, a different body will be required for each desired depth of back countersink. For that reason, an adjustable attachment of the body and depth control member is to be preferred.

The term countersunk or countersinking as used herein means the removal of material around the hole for some distance inside the back face of the plate of the material being treated. The countersinking operation can be performed by either the chamfering tool having the cutting edge at an acute angle with the axis of the stem, or by the spot facing tool having the cutting edge at a ninety degree angle with the axis of the stem. The usual spot facing operation performed by the spot facing tool does not, however, usually perform a countersink; usually it simply flattens the rear surface of the material around the hole. Both the chamfer type of tool and the spot facing type of tool are referred to in the appended claims as a cutting tool.

The term "treat" or "treated" as used in the appended claims covers both the chamfering or countersinking operation, and the spot facing operation.

The term "angle" or "angle of the cutting edge" as used herein means either an acute angle as used in the chamfer tool, or a ninety degree angle as used in the spot facing tool.

This invention is not to be limited by the embodiments shown in the drawings and described in the description, which are given by way of example and not of limitation, but only in accordance with the scope of the appended claims.

I claim:

1. A back cutting tool for entering a hole in an object, said hole having a wall, and cutting around said hole on the back side thereof, comprising: a body having an internal bore therethrough; a depth control member engaged to said body and adjustably moveable axially in said bore, a shank portion on said depth control member, said depth control member and shank portion having a stem passageway therethrough, said depth control member, bore, stem passageway, and shank portion all having a common central axis, the shank portion being so disposed and arranged that it can protrude from the body in at least some axial positions of the depth control member, and a continuous abutment surface on said depth control member, which abutment surface is disposed around said central axis and which faces in the same direction as the said shank portion protrudes from the body; a cutting bit comprising a stem fitted in said stem passageway having an axis which coincides with the stem passageway's central axis, said stem being rotatably and axially movable relative to the body and the depth control member irrespective of its axial position in said stem passageway, a cutting tooth projecting laterally from the side of the stem, a cutting edge on said tooth facing toward said abutment surface, and a shoulder on the cutting bit so disposed and arranged as to contact said abutment surface in one position of the stem relative to the depth control member, whereby the stem can be extended from the shank portion so that the tooth is spaced from the shank portion by a distance at least as great as the depth of the hole through an object whose back side is to be treated, and whereby the cutting bit can thereafter be inserted in the hole so that the cutting edge is on the back side thereof, and the shank portion can thereafter be inserted into the hole so that the shank portion positions the stem in the hole and moves the cutting tooth to an offset position, and whereby, with the body pushed toward the object, the stem can be simultaneously rotated and pulled relative to the body and depth control member so that the cutting edge is drawn against the back of the object to cut the object until the shoulder bears against the abutment surface to limit the depth of the cut.

2. A back cutting tool for entering a hole in an object, said hole having a wall, and cutting around said hole, on the back side thereof, comprising: a body having an internal bore therethrough; a depth control member engaged to said body and adjustably movable axially in said bore, a shank portion on said depth control member having an outer wall, said depth control member and shank portion having a stem passageway therethrough, said depth control member, bore, stem passageway, and shank portion all having a common central axis, the shank portion being so disposed and arranged that it can protrude from the body in at least some axial positions of the depth control member, there being a plurality of points on the outer wall of the shank portion which are the farthest points thereon radially outward from said central axis, said points being equidistant from said central axis, and a continuous abutment surface on said depth control member, which abutment surface is disposed around said central axis and which faces in the same direction as the said shank portion protrudes from the body; a cutting bit comprising a stem fitted in said stem passageway having an axis which coincides with the stem passageway's central axis, said stem being rotatably and axially movable relative to the body and the depth control member irrespective of its axial position in said stem passageway, a cutting tooth projecting laterally from the side of the stem, a cutting edge on said tooth facing toward said abutment surface, and a shoulder on the cutting bit so disposed and arranged as to contact said abutment surface in one position of the stem relative to the depth control member, whereby the stem can be extended from the shank portion so that the tooth is spaced from the shank portion by a distance at least as great as the depth of the hole through an object whose back side is to be treated, and whereby the cutting bit can thereafter be inserted in the hole so that the cutting edge is on the back side thereof, and the shank portion can thereafter be inserted into the hole so that the said points on the outer wall contact the wall of the hole thereby centering the depth control member and stem in the hole and moving the cutting tooth to an offset position, and whereby, with the body pushed toward the object, the stem can be simultaneously rotated and pulled relative to the body and depth control member so that the cutting edge is drawn against the back of the object to cut the object until the shoulder bears against the abutment surface to limit the depth of the cut.

3. A back cutting tool according to claim 2 in which the shoulder is disposed adjacent the junction of the cutting tooth and the stem, and the abutment surface is a surface of revolution around said central axis on the protruding end of the shank.

4. A back cutting tool according to claim 2 in which the bore in the body is internally threaded, and in which the depth control member has external threads, whereby the axial position of the shank relative to the body is adjusted by turning the depth control member in the body.

5. A back cutting tool according to claim 4 in which the shoulder is disposed adjacent the junction of the cutting tooth and the stem, and the abutment surface is a surface of revolution around said central axis on the protruding end of the shank.

References Cited in the file of this patent

UNITED STATES PATENTS

| 2,365,549 | Haynes | Dec. 19, 1944 |
| 2,365,648 | Rossmann | Dec. 19, 1944 |
| 2,404,027 | Belanger | July 16, 1946 |

FOREIGN PATENTS

| 315,601 | Germany | Oct. 28, 1919 |